United States Patent [19]

Morooka

[11] 4,389,888
[45] Jun. 28, 1983

[54] LEVEL METER
[75] Inventor: Shinichi Morooka, Tokyo, Japan
[73] Assignee: Tokyo Shibaura Denki Kabushiki Kaisha, Kawasaki, Japan
[21] Appl. No.: 215,661
[22] Filed: Dec. 12, 1980
[30] Foreign Application Priority Data Dec. 21, 1979 [JP] Japan ............................ 54-165499
Dec. 6, 1980 [JP] Japan .............................. 55-12445

[51] Int. Cl.³ ........................................ G01F 23/14
[52] U.S. Cl. ................................................. 73/299
[58] Field of Search ..................... 73/299, 301, 302; 116/227; 340/618

[56] References Cited

U.S. PATENT DOCUMENTS 1,665,667 4/1928 Küsters ................................ 73/299
2,032,681 3/1936 Zenner ................................ 73/299

FOREIGN PATENT DOCUMENTS 1185830 1/1965 Fed. Rep. of Germany .
536704 12/1955 Italy ................................... 73/299
779338 7/1957 United Kingdom .
1124961 8/1968 United Kingdom .
1372283 10/1974 United Kingdom .
1384390 2/1975 United Kingdom ................ 73/299

OTHER PUBLICATIONS

E.P.M. Instrumentation, vol. 3, 1948, C. F. Cusick & al.: "Technique of Measuring Liquid Level in Vessels Under Pressure", p. 19.
Japanese Utility Model Publication No. 34-10745, Jun. 6, 1955.
JSME Handbook for Mechanical Engineering, Chap. 6, Sec. 9.2.2.

Primary Examiner—Edward R. Kazenske
Assistant Examiner—Denis Corr
Attorney, Agent, or Firm—Oblon, Fisher, Spivak, McClelland & Maier

[57] ABSTRACT

According to a level meter of this invention, a pressure corresponding to a fixed water level formed by means of a reference chamber and a vertical pipe is applied to one pressure inlet port of a differential pressure detector, and a pressure corresponding to a water surface or water level inside a container to be measured is applied to the other pressure inlet port of the differential pressure detector by means of a lower pipe. Then, the water level inside the container is measured through the difference between these two pressures, the density of water to generate the pressures to be applied to the differential pressure detector, and the density of steam inside the container and the reference chamber. Adiabatic jackets are attached to the peripheries of the vertical pipe and the lower pipe.

1 Claim, 4 Drawing Figures

LEVEL METER

This invention relates to a level meter comprising a container containing water at its lower portion and steam at its upper portion, a reference chamber containing water at a level higher than the water level inside the container and containing steam over such water, a differential pressure detector having two pressure inlet ports and disposed in a position below the water level inside the container, whereby the difference between two pressures applied severally to the pressure inlet ports is detected, a vertical pipe connecting the bottom end of the reference chamber with one of the pressure inlet ports of the differential pressure detector and filled with water, a lower pipe connecting the water containing portion of the container with the other pressure inlet port of the differential pressure detector and filled with water, and an upper pipe connecting the steam containing portion of the container with the steam containing portion of the reference chamber, thereby maintaining the surface of the water in the reference chamber at a fixed high-level position relative to the differential pressure detector and maintaining the respective steam containing portions of the container and the reference chamber at the same pressure.

The level meter of this type is widely used for measurement of the water level of a coolant, e.g. water, in a pressure container of a pressurized water reactor or a boiling water reactor, as well as of a common boiler (the coolant will hereinafter be referred to simply as water with respect to the boiler and reactor). The results of such water level measurement are utilized as important data necessary for the water level control, feed-water control and other safety measures for the boiler or reactor. Accordingly, the level meter must operate correctly within a given allowable error even in case of trouble, such as steam leakage of the pipe system of the container.

The level meter of the aforementioned type is conventionally known, and the principle of measurement of the level meter is as follows. A water pressure to be applied to one pressure inlet port of the differential pressure detector is formed by the fixed reference water level. Thus, the water level inside the container may be calculated by combining the value of the reference water level and the detection result of the difference pressure detector with the values of density of water and steam in the container and the level meter.

Although highly serviceable, the conventional level meter still has drawbacks to be overcome. As an example of such drawbacks, if high-temperature, high-pressure steam leaks out from the container, e.g. pressure container of boiler or reactor, to reduce the pressure inside the container and to drastically increase the temperature of the ambient air surrounding the level meter, heat of the ambient air will rapidly be transmitted to the water in the level meter to change the density of the water and to boil the water. Accordingly, the differential pressure detector delivers an output involving a great error before an emergency safety device is actuated to reduce the temperature of the ambient air. In a further advanced stage, the boiling of the water will cause detection signals from the differential pressure detector to go on fluctuating substantially, thereby prohibiting the calculation of the water level in the container.

The object of this invention is to provide a level meter free from the aforementioned drawbacks of the prior art level meter and capable of measuring a water level inside a container with a relatively small error even when the ambient temperature is suddenly increased by, for example, leakage of steam.

In order to attain the above object, the level meter of this invention is provided with heat transmission inhibiting means attached to a differential pressure detecting section including the reference chamber, the vertical pipe, and the lower pipe, whereby the heat transmission between the ambient air around the level meter and the interior of the differential pressure detecting section caused by the temperature difference therebetween is inhibited, so that the temperature of the ambient air around the level meter may be reduced by means of a safety device attached to a boiler or reactor before the temperature of water inside the differential pressure detecting section increases to cause a substantial error in measurement or the water inside the differential pressure detecting section goes so far as to boil to extraordinarily vary the output of the detector and hence to prohibit stable and secure measurement of the water level in the container, in a state of emergency where the temperature of the outer periphery of the differential pressure detecting section is increased. According to the level meter of the invention, therefore, the water level inside the container can continuously be measured with stability without involving any substantial error despite the aforesaid state of emergency.

The first heat transmission inhibiting means has an adiabatic jacket provided around the vertical pipe and the lower pipe. The second means includes an adiabatic jacket attached to the whole periphery of the vertical pipe except an exposed portion extending from said reference chamber over a given length and an adiabatic jacket on the lower pipe. The third means comprises above mentioned second means and a cooler attached to the exposed top end. The aforementioned effects may be obtained with use of any level meters employing these heat transmission inhibiting means. As for the construction and function of these means, they will be described in detail in conjunction with preferred embodiments of the invention as mentioned later.

This invention can be more fully understood from the following detailed description when taken in conjunction with the accompanying drawings, in which.

Figure 1:
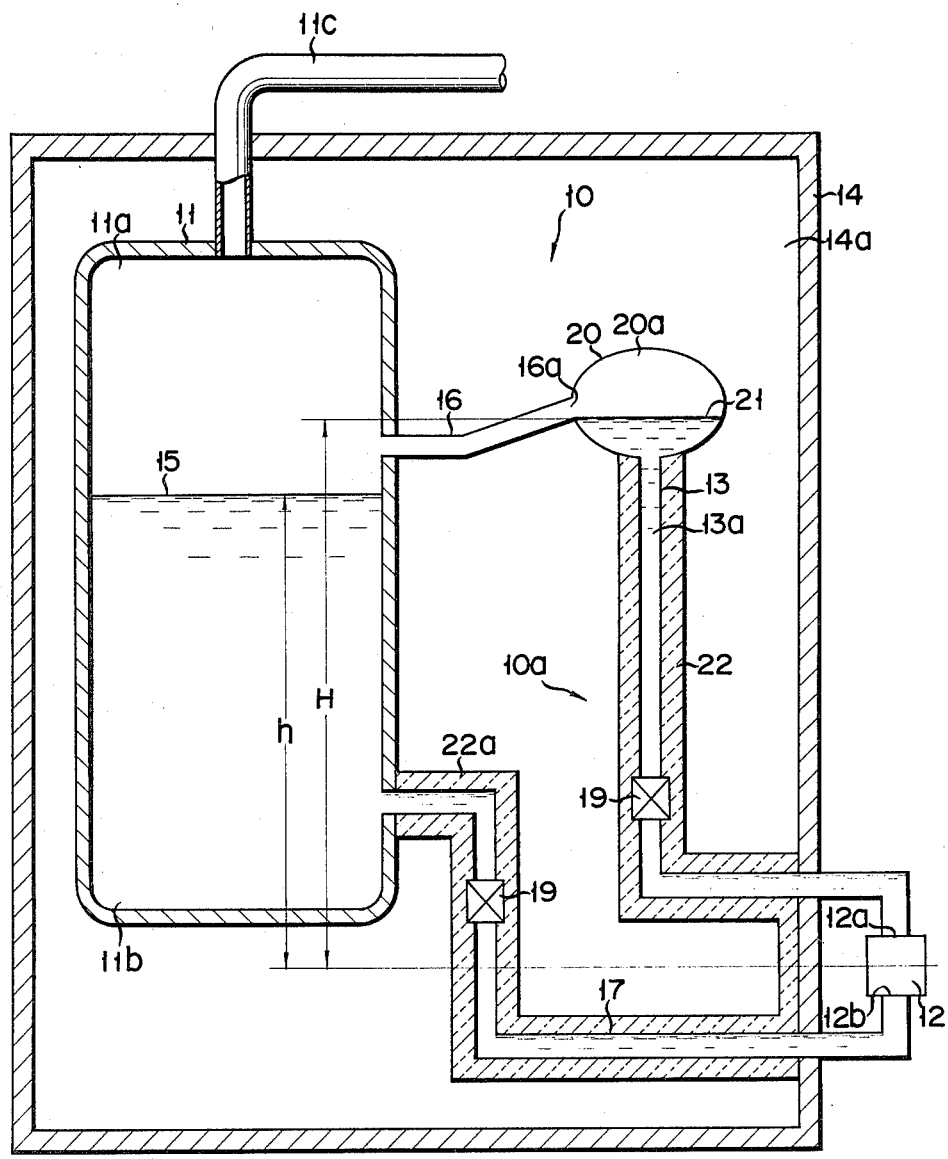
FIG. 1 shows a first embodiment of this invention.

Referring now to the drawing of FIG. 1, there is shown a level meter 10 according to an embodiment of this invention which is attached to a pressure container 11 of a boiling water reactor or a pressurized water reactor. The pressure container 11 and the level meter 10 are disposed within a drywell 14 except a differential pressure detector 12 and a part of a vertical pipe 13 and a part of a lower pipe that are connected with the differential pressure detector 12. Cooling water is put in the pressure container 11, defining a steam containing portion or upper space 11a over its water surface 15 and a cooling water containing portion or lower space 11b under the surface 15. The forward end portion of an upper pipe 16 extending from the upper space 11a of the pressure container 11 is upwardly inclined, connected directly with the lateral face of a reference chamber 20, and has an opening 16a. The reference chamber 20 is connected at its bottom side with the vertical pipe 13 which extends substantially vertically downwardly and is bent to be connected with one pressure inlet port 12a of the differential pressure detector 12. That portion of the vertical pipe 13 which extends within the drywell 14 is covered with an adiabatic jacket 22 made of e.g. asbestos or perlite. The other pressure inlet port 12b of the differential pressure detector 12 is connected with a lower pipe 17 extending from the lower space 11b of the pressure container 11. That portion of the lower pipe 17 which extended within the drywell 14 is covered with an adiabatic jacket 22a made of the same material as the jacket 22. As may be seen from the foregoing explanation, the level meter 10 of this embodiment comprises a differential pressure detecting section 10a including the reference chamber 20, vertical pipe 13, lower pipe 17, and differential pressure detector 12, the upper pipe 16, and the adiabatic jackets 22 and 22a attached to the differential pressure detecting section 10a except the differential pressure detector 12. While cooling water is introduced into the reference chamber 20 and the vertical pipe 13, the water surface inside the reference chamber 20 never rises above the bottom edge of the opening 16a of the upper pipe 16 which serves as a drain pipe. The water surface flush with the bottom edge of the opening 16a is called a reference water surface 21. Between the reference water surface 21 and the differential pressure detector 12 extends a reference water column 13a which applies a water pressure corresponding to a given reference water level H to the differential pressure detector 12. The upper pipe 16 serves as a drain pipe to act on the reference chamber 20 and also connects the upper space 11a of the pressure container 11 with a steam containing portion or upper space 20a defined over the reference water surface in the reference chamber 20, thereby maintaining the pressures inside both these upper spaces 11a and 20a at the same level.

Now the operation of the level meter 10 will be described. When the reactor is operated in a normal state, the cooling water in the pressure container 11 is heated to a high temperature, and high-temperature, high-pressure steam is collected in the upper space 11a, and is transmitted to, for example, a steam turbine (not shown) through a main steam pipe 11c. The high-temperature, high-pressure steam also enters the upper space 20a inside the reference chamber 20 through the upper pipe 16. Since the temperature inside the space 20a is lower than the temperature of the introudced steam, the steam is liquefied within the upper space 20a. Owing to the drain function of the upper pipe 16, however, the position of the reference water surface 21 is maintained, and the reference water level H makes no change. Since the high-temperature, high-pressure steam is introduced and liquefied in the reference chamber, as mentioned above, heat is continuously supplied from the pressure container 11 to the interior of the reference chamber 20. However, ambient air 14a inside the drywell 14 is cooled by a cooler (not shown) usually disposed in the drywell 14, so that the temperature of the reference water column 13a is approximately 100° C.—higher than the ambient temperature t° C.—at its upper portion, whereas the lower portion of the reference water column 13a is kept at substantially the same temperature as t° C. In this embodiment, the temperature t° C. is 60° C. or thereabouts, and the upper portion of the reference water column 13a where the temperature is higher than t° C. is a portion which extends between the top end inside the reference chamber 20 or the reference water surface 21 and a point about 100 mm thereunder. Although water at the upper portion of the reference water column 13a is at approximately 100° C. in the normal operating state, it will never boil if such value is exceeded in some measure. The reason is that the pressure inside the level meter 10 is more than 1 atm.

In the aforesaid operating state, moreover, the level difference between the water level h or the water surface 15 inside the pressure container 11 and a set position of the differential pressure detector 12 is calculated as follows:

$$h = \frac{H(\rho_o - \rho_g) - \Delta P}{\rho_l - \rho_g} \quad (1)$$

Here H is the reference water level, $\Delta P$ is a differential pressure detected by the differential pressure detector 12, $\rho_l$ is the density of water inside the pressure container 11, $\rho_g$ is a saturated steam density corresponding to the reactor pressure P and temperature inside the upper space 11a of the pressure container 11, and $\rho_o$ is the density of water defining the reference water level.

As may be seen from equation (1), the value of h is calculated by substituting the predetermined reference water level H, the value $\Delta P$ detected by the differential pressure detector 12, and the suitably selected densities $\rho_l$, $\rho_g$ and $\rho_o$ nto equation (1). When using equation (1), $\rho_o$ is the density of cooling water corresponding to the temperature of the ambient air 14a. Substitution of such value of $\rho_o$ is reasonable because the temperature of the reference water column 13a, except a limited top end portion thereof, is substantially equal to that of the ambient air 14a. Thus, in the normal operation, a substantially correct water level inside the pressure container may be calculated by the use of equation (1).

Now there will be described the operation of the level meter 10 in a case where high-temperature, high-pressure steam leaks out from the pressure container 11 or the main steam pipe 11c into the drywell 14.

In this embodiment, the temperature of the high-temperature, high-pressure steam in the pressure container 11 is supposed to be 170° C. When the leaked steam enters the drywell 14, the temperature of the ambient air 14a suddenly increases to approximately 170° C., and the pressures inside the pressure container 11 and the level meter 10 are drastically reduced substantially to atmospheric pressure. Accordingly, the cooling water in the pressure water 11 and the cooling water in the upper portion of the level meter 10 are immediately brought to a boiling state to fluctuate the output signal of the differential pressure detector 12 for a short time. Then, the steam introduced into the drywell 14 begins to heat the level meter 10, so that temperatures of the reference water column 13a and the cooling water in the lower pipe 17 start increasing. When the aforesaid leakage of steam begins, a safety device (not shown) of the reactor operates and intends to actuate a spray device (not shown). However, such operation requires a substantial time, e.g. 1,000 seconds, and the reference water column 13a continues the aforesaid temperature rise in the meantime. In this case, if there is provided neither of the adiabatic jackets 22 and 22a, a condensed film of steam is formed on the surfaces of the vertical pipe 13 and the lower pipe 17, so that the temperatures at these surfaces very quickly reach approximately 170° C. Accordingly, the reference water column 13a and all the cooling water in the lower pipe 17 reach 100° C. or more to start boiling in approximately 1,000 seconds. As a result, the output of the differential pressure detector 12 fluctuates extraordinarily, making it impossible to obtain the exact magnitude of the output signal. Thus, calculation of the water level h by means of equation (1) is prevented. In the level meter of this invention, however, there are provided the adiabatic jackets 22 and 22a to cover the vertical pipe 13 and the lower pipe 17. Therefore, even though the condensed film is formed on the surfaces of the jackets 22 and 22a to cause the surfaces to quickly reach a temperature of about 170° C., very little flow of heat will be transmitted to the cooling water in the differential pressure detecting section 10a through the vertical pipe 13 and the lower pipe 17. Accordingly, the rise in temperature of such cooling water will greatly be retarded; the temperature of the cooling water as measured at the middle-level position of the reference water column 13a after the lapse of approximately one hour (3,600 seconds) will reach only about 60° C. to 75° C. As a result, the spray device starts its spraying operation before the temperature of the cooling water reaches approximately 75° C., so that a stable value of water level h may be obtained with use of the level meter 10. The obtained value of water level h is subject to little error since the temperature rise of the reference water column 13a can be minimized to reduce the change of the density of the cooling water forming the reference water column 13a. Although lacking stability in the measurement of the water level h due to the boiling of part of the cooling water induced by decompression at the beginning of the steam leakage, the level meter 10 of this invention can steadily continue the measurement of the water level h without involving any substantial error.

In FIG. 1, numeral 19 designates valves attached to the vertical pipe 13 and the lower pipe 17 to facilitate the removal of the differential pressure detector 12 in the case of inspection or repair thereof.

Figure 2:
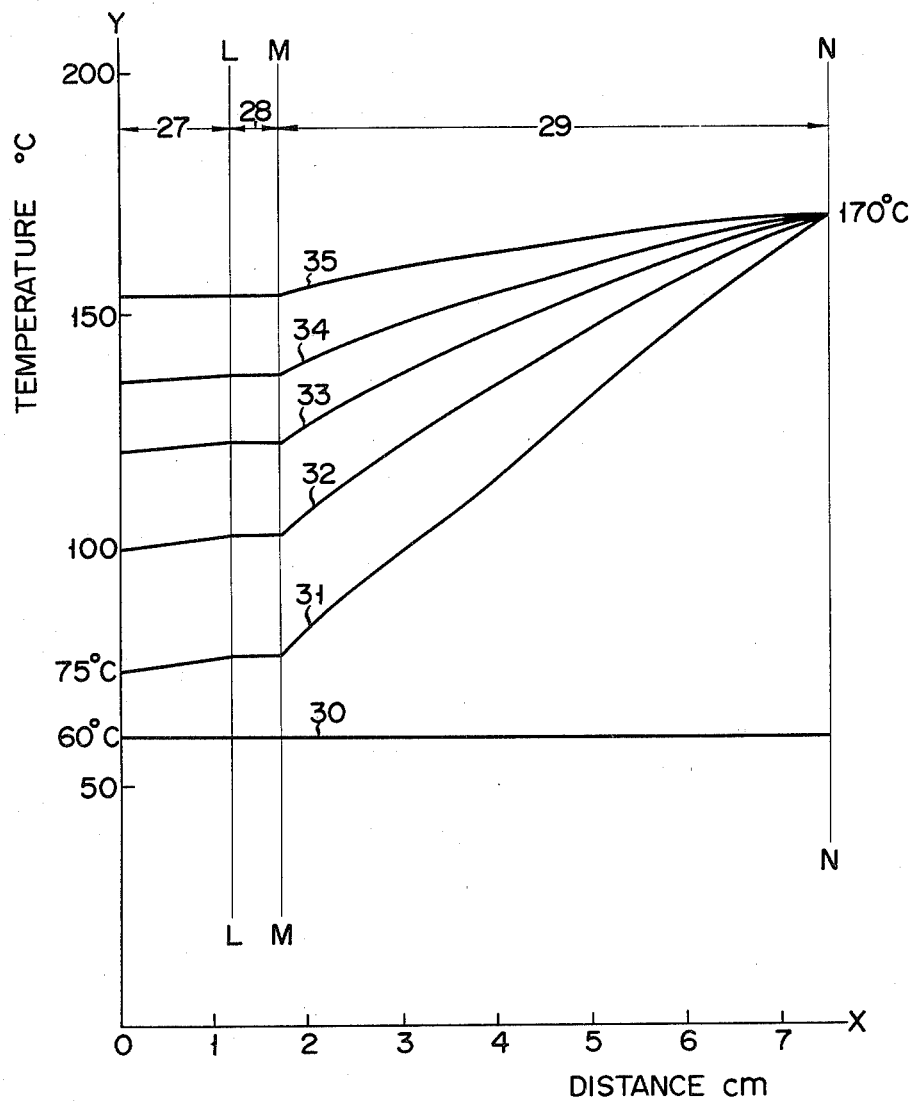
FIG. 2 is a graph showing experimental data for illustrating the effect of the embodiment of FIG. 1.

FIG. 2 is a graph showing how the horizontal temperature distribution at the center-level position of the vertical pipe 13 of the level meter of the embodiment of FIG. 1 having the two adiabatic jackets 22 and 22a, as taken along a line from the central axis portion of the vertical pipe 13 through the pipe wall and the adiabatic jacket 22 to the surface of the jacket 22, varies with the passage of every hour after the outer periphery of the adiabatic jacket 22 reaches a temperature of approximately 170° C. The results shown in FIG. 2 suggest no cooling effect attributable to the operation of the spray device. In the graph of FIG. 2, the Y-axis corresponds to the central axis of the vertical pipe 13, lines LL and MM represent the positions of the inner and outer peripheral surfaces of the vertical pipe 13, respectively, and a line NN represents the position of the surface of the adiabatic jacket 22. Thus, ranges indicated by numerals 27, 28 and 29 correspond to the distance between the central axis of the cooling water in the vertical pipe 13 and the inner peripheral surface of the vertical pipe 13, the thickness of the wall of the vertical pipe 13, and the thickness of one side of the adiabatic jacket 22, respectively. The X-axis is an axis of abscissa representing a length ranging between the distance between the Y-axis and the line NN. A straight line 30 substantially parallel with the X-axis represents the temperature distribution in a case where the reactor is in its normal operating state. This temperature distribution curve can therefore be regarded as one obtained when the high-temperature, high-pressure steam is ejected into the drywell 14. In this case, the temperatures at various points from the central-axis portion of the vertical pipe to the outer peripheral surface of the adiabatic jacket 22 have substantially the same value, as shown in FIG. 2. Curves 31, 32, 33, 34 and 35 are temperature distribution curves obtained in 1 hour, 2 hours, 3 hours, 4 hours and 6 hours after the ejection of the high-temperature, high-pressure steam, respectively. The curve 30 is a temperature distribution curve obtained at the time of such ejection. The curve 31 indicates that, in 1 hour after the start of the rise in temperature of the ambient air 14a, the surface of the adiabatic jacket 22 is at 170° C., the temperature suddenly falls as the outer periphery of the vertical pipe 13 is approached and becomes approximately 76° C. at the outer and inner peripheral surfaces of the vertical pipe 13, and is finally reduced toward the position of the central axis OY to reach approximately 75° C. Within one hour from the point of time corresponding to the straight line 30, as may be seen from FIG. 2, the temperature of the cooling water in the vertical pipe 13 never rises above 75° C., so that the cooling water will never boil. It may therefore be seen from the curve 31 that the cooling water in the differential pressure detecting section 10a can be limited to 75° C. or less for an hour by using the level meter 10 of FIG. 1, and that the water level inside the pressure container 11 can continuously be measured with relatively small error after the passage of the aforesaid hour with the aid of the spray device to operate in the meantime.

Figure 3:
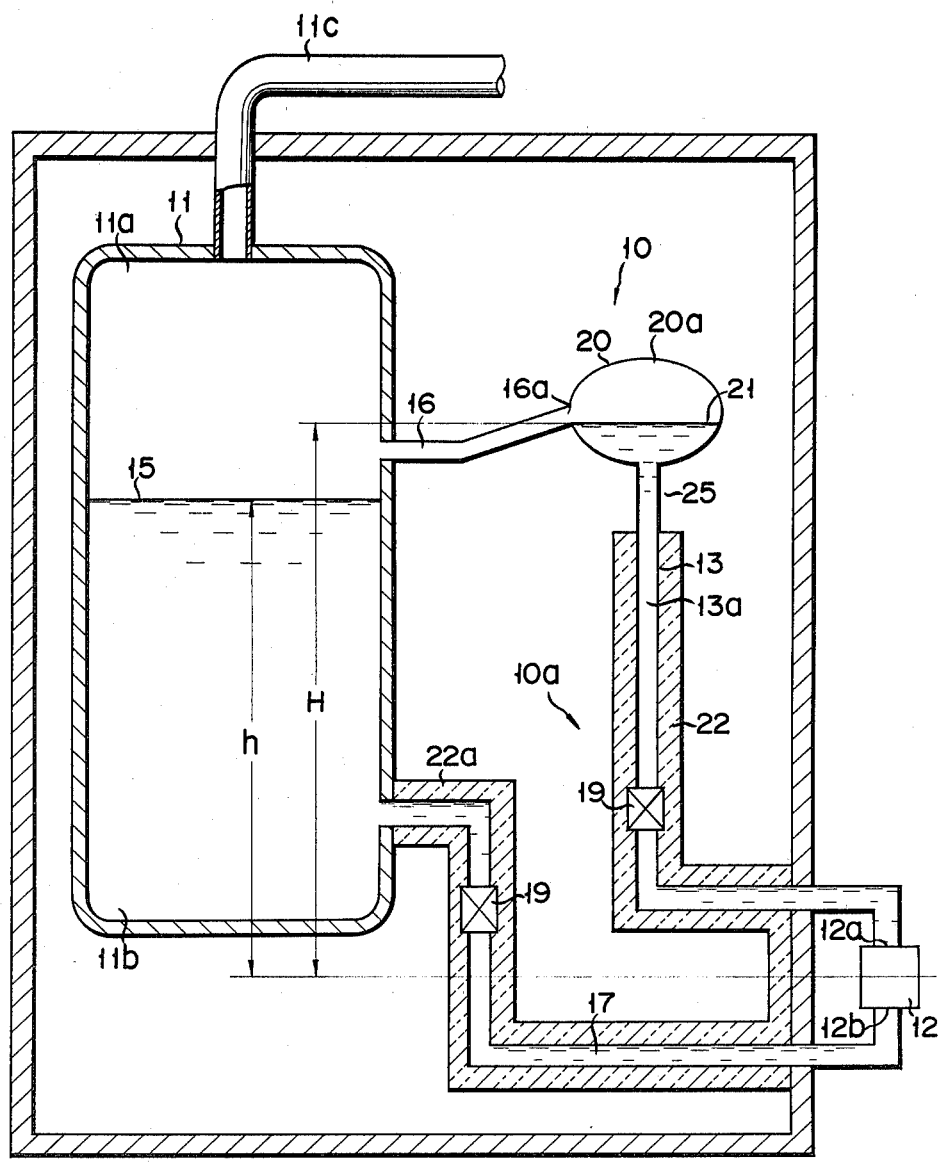
FIG. 3 shows a second embodiment of the invention.

FIG. 3 shows the principal part of a second embodiment of the invention. The level meter of this embodiment differs from the level meter of FIG. 1 in that the vertical pipe 13 of FIG. 3 has at its top end an unjacketed portion 25 exposed to the ambient air. Since other portions are the same as those of the level meter of FIG. 1, only such point of difference will now be described in detail. The exposed portion 25 radiates to the ambient air 14a the heat applied to the upper portion of the reference water column 13a through the high-temperature, high-pressure steam which is introduced from the pressure container 11 through the upper pipe 16 during the normal operation, thereby inhibiting the temperature rise at such portion of the reference water column 13a. When the high-temperature, high-pressure steam is discharged into the drywell 14, heat is applied to the water inside the vertical pipe 13 through the unjacketed or exposed portion 25. Since the exposed portion 25 is only a small part of the vertical pipe 13, the heat applied to the cooling water in the vertical pipe 13 through the exposed portion 25 is relatively small. Normally, moreover, the temperature rise in the cooling water at the portion corresponding to the exposed portion 25 is limited by the very exposed portion 25. Accordingly, the increase in the temperature of the reference water column 13a is retarded as compared with the case of FIG. 1. Thus, the spray device can start operation long before the start of the boiling of the water in the level meter, and the level meter can perform the measurement of the water level h with high accuracy and stability.

Figure 4:
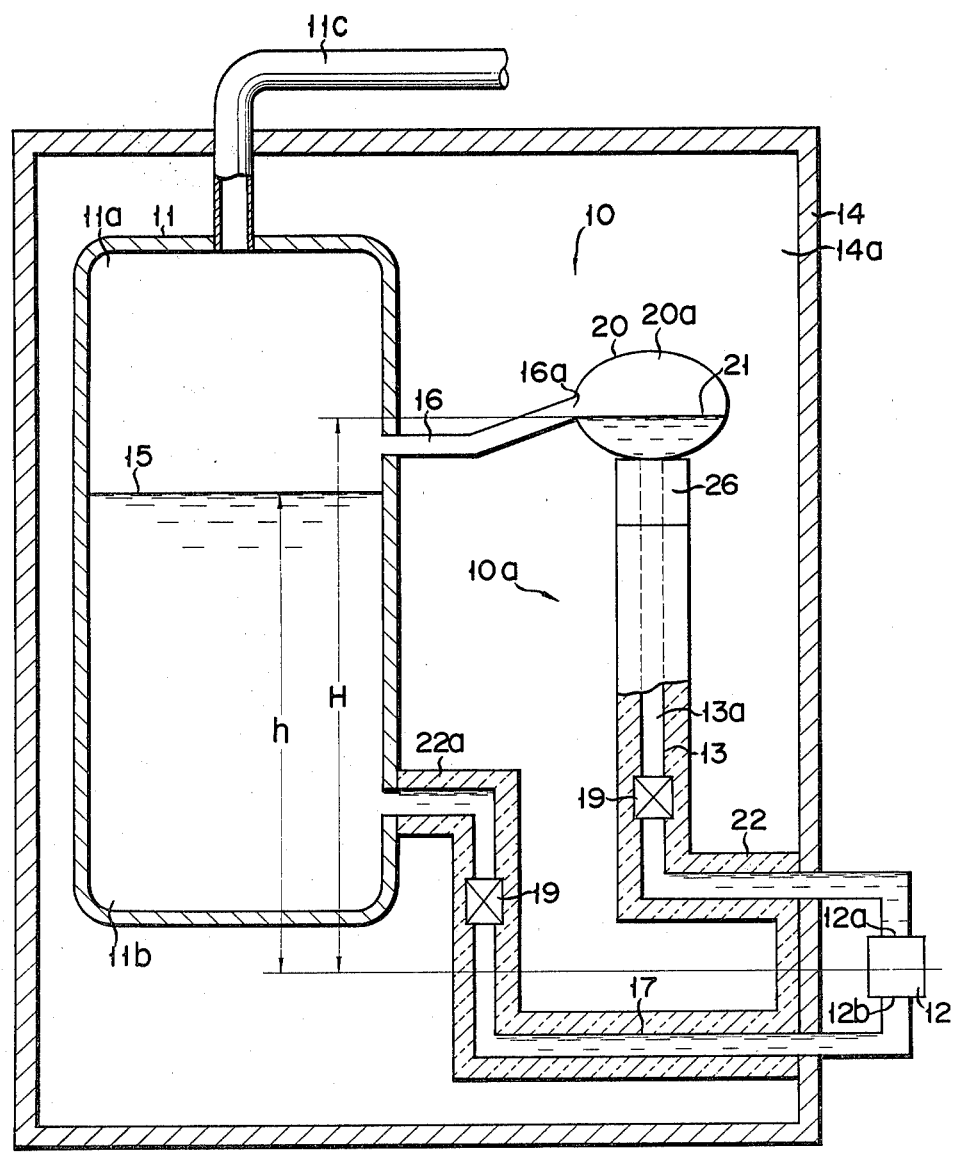
FIG. 4 shows a third embodiment of the invention.

FIG. 4 shows a third embodiment of this invention. The difference between this embodiment and the embodiment of FIG. 3 lies in that a cooler 26 is attached to the exposed portion 25 of FIG. 4. Since other portions are the same as those of the embodiment of FIG. 1, only such difference will now be described in detail. The cooler 26 controls the temperature rise in the cooling water at the top end portion of the reference water column 13a, cooling the water to substantially the same temperature level as the ambient air 14a. Accordingly, the speed of the temperature rise in the reference water column 13a attributable to the high-temperature, high-pressure steam in the drywell 14 can be reduced. Thus, the cooler 26 can be regarded as a means to augment the effect of the exposed portion 25 of the level meter of the embodiment of FIG. 3.

What is claimed is:

1. A level meter comprising:
   a container having water at its lower portion and steam at its upper portion;
   a reference chamber containing water at a level higher than the water level inside said container and containing steam over said water;
   a differential pressure detector having two pressure inlet ports and disposed in a position below the water level inside said container, whereby the difference between two pressures separately applied to said pressure inlet ports is detected;
   a vertical pipe connecting the bottom end of said chamber with one of said pressure inlet ports of said differential pressure detector and being filled with water;
   a lower pipe connecting the water containing portion of said container with the other pressure inlet port of said differential pressure detector and being filled with water;
   an upper pipe connecting the steam containing portion of said container with the steam containing portion of said chamber, thereby maintaining the surface of the water in said chamber at a fixed high-level position relative to said differential pressure detector and maintaining the respective steam containing portions of said container and said reference chamber at the same pressure; and
   an adiabatic jacket covering the periphery of said vertical pipe, except for an exposed portion of a predetermined length which extends from said reference chamber, whereby the heat transmission between the outer periphery and the interior of said vertical pipe caused by the temperature difference therebetween is inhibited,
   so that an increase of the temperature of water inside said vertical pipe which may cause an error in measurement of the level of the water in the container, as well as boiling of said water, can be retarded even when the temperature at the outer periphery of said vertical pipe is increased suddenly, further comprising a cooler attached to said exposed portion of the vertical pipe between said adiabatic jacket and said reference chamber for cooling said portion.

* * * * *

UNITED STATES PATENT AND TRADEMARK OFFICE
CERTIFICATE OF CORRECTION

PATENT NO. : 4,389,888
DATED : June 28, 1983
INVENTOR(S) : Shinichi Morooka et al It is certified that error appears in the above-identified patent and that said Letters Patent is hereby corrected as shown below:

On the title page:

In item [30] Foreign Application Priority Data,

"Dec. 6, 1980 [JP] Japan ..... 55-12445" should read

--Feb. 6, 1980 [JP] Japan ..... 55-12445--.

Signed and Sealed this

Thirteenth Day of September 1983

[SEAL]

Attest:

GERALD J. MOSSINGHOFF

Attesting Officer

Commissioner of Patents and Trademarks